United States Patent
Baracco (10) Patent No.: US 12,337,506 B2
(45) Date of Patent: Jun. 24, 2025

(54) GRANULATION APPARATUS, METHOD FOR MAINTAINING THE SAME AND GRANULATION METHOD

(71) Applicant: BARACCO S.R.L. UNIPERSONALE, Occhiobello (IT)

(72) Inventor: Alberto Baracco, Occhiobello (IT)

(73) Assignee: BARACCO S.R.L. UNIPERSONALE, Occhiobello (IT)

( * ) Notice: Subject to any disclaimer, the term of this patent is extended or adjusted under 35 U.S.C. 154(b) by 204 days.

(21) Appl. No.: 18/145,910

(22) Filed: Dec. 23, 2022

(65) Prior Publication Data
US 2023/0202071 A1 Jun. 29, 2023

(30) Foreign Application Priority Data
Dec. 23, 2021 (IT) .................. 102021000032453

(51) Int. Cl.
*B29B 9/06* (2006.01)
(52) U.S. Cl.
CPC ...................... *B29B 9/06* (2013.01)
(58) Field of Classification Search
CPC .................... B29B 9/06; B26D 5/02
See application file for complete search history.

(56) References Cited

U.S. PATENT DOCUMENTS

| | | |
|---|---|---|
| 5,223,279 A | 6/1993 | Lambertus |
| 7,128,546 B2 | 10/2006 | Chszaniecki et al. |
| 2005/0202114 A1 | 9/2005 | Chszaniecki et al. |
| 2010/0043616 A1 | 2/2010 | Edelman et al. |
| 2012/0076884 A1 | 3/2012 | Schmidt |

FOREIGN PATENT DOCUMENTS

| | | | |
|---|---|---|---|
| CN | 209320046 U | 8/2019 | |
| DE | 4116933 A1 | 11/1992 | |
| DE | 10234229 A1 | 2/2004 | |
| EP | 0972622 A1 * | 1/2000 | ............... B01J 2/20 |
| EP | 3915747 A1 | 12/2021 | |
| GB | 848596 A | 9/1960 | |
| WO | 2021242563 A1 | 12/2021 | |

OTHER PUBLICATIONS

Italian Search Report for IT Patent Application No. 202100032453, Aug. 2, 2022, 2 pages.

* cited by examiner

*Primary Examiner* — Timothy Kennedy
(74) *Attorney, Agent, or Firm* — Armstrong Teasdale LLP (57) ABSTRACT

A granulation apparatus for granulating a plastic material is provided. The granulation apparatus has a fixed support extending along a vertical axis, a rotating support, connected in a rotatable manner to the fixed support, and actuatable in rotation about a first direction parallel or coincident with the vertical axis, a die connected to an extruder, a cutting assembly suitable for facing the die and constrained to the rotating support so that, by rotating the rotating support around the first direction, the cutting assembly also rotates around that first direction. In one embodiment the cutting assembly is slidably constrained relative to the rotating support. In a further embodiment the cutting assembly is supported in a cantilevered manner by the rotating support. A maintenance method for the granulation apparatus and a granulation method for a molten plastic material are also provided.

22 Claims, 10 Drawing Sheets

GRANULATION APPARATUS, METHOD FOR MAINTAINING THE SAME AND GRANULATION METHOD

CROSS REFERENCE TO RELATED APPLICATION

This application claims priority to and benefit of Italian Patent Application No. 102021000032453 filed Dec. 23, 2021, the contents of which are incorporated by reference herein in their entirety.

FIELD OF THE INVENTION

The present invention relates to a granulation apparatus suitable for carrying out granulation operations on a stream of molten plastic material exiting from a die placed downstream of an extruder.

In particular, the present invention finds application within the plastics processing sector, specifically in the production of granules or pellets of different sizes.

BACKGROUND OF THE INVENTION

The term "granulation operations" in this discussion refers to the set of operations that makes it possible to obtain granules or pellets from a stream of molten material exiting from an extruder.

Granulation is also known in the industry as pelletizing and the apparatuses suitable for performing granulation operations are also known as granulators or pelletizers.

The material is melted in an extruder and directed towards an output flange. The flange is connected to a die, i.e. a flat disc provided with holes in order to separate the stream of molten material into a plurality of smaller streams.

The material exiting from the extruder is forced to pass through the die and reach a granulation chamber.

The granulation system comprises a rotating cutting assembly within the granulation chamber, comprising a blade assembly suitable for entering into contact with the die to cut the molten plastic material exiting from the holes thereof.

The material exiting from the holes of the die, in encountering the rotating blades, is cut and precipitated into the granulation chamber, and then transported to an output mouth.

Currently, the known solutions provide for the cutting assembly being supported on a sliding stand on wheels or ground-bound rails.

Disadvantageously, these solutions generate high floor space requirements, with the consequent reduction of the working space around the machine in which an operator may work.

Moreover, disadvantageously, these solutions need to provide fairly smooth flooring, so as not to create imbalances or misalignments at the level of the cutting assembly. It is clear that such a solution is not always possible and therefore these solutions are not applicable to every working context without causing processing uncertainties.

Furthermore, disadvantageously, ground-bound rails, in addition to causing an obstruction, must be kept clean and protected from wear and tear.

Disadvantageously, these rails are subject to deformation caused by the falling of heavy metal objects or the presence of processing waste.

After processing, after each cycle or after several cycles, the extrusion flange, the die, the cutting assembly and the granulation chamber must be cleaned in order to remove any residues of plastic material that have remained adhered to the aforementioned components, or granules that have not been transported correctly towards the granulator output.

The known solutions allow these components to be reached for maintenance and cleaning only following the movement of these components along said rails or said wheels.

Disadvantageously, therefore, these solutions require a very large workspace to be left free in order to perform the aforementioned movement.

SUMMARY OF THE INVENTION

The need to provide a granulation apparatus capable of overcoming the disadvantages and limits of the solutions known in the prior art is therefore strongly felt.

In particular, the need is felt to provide an apparatus that is not cumbersome and that maintains, or at least improves, the technical features of the prior art and at the same time makes it possible to access the components in order to carry out maintenance in a simple and comfortable way.

This need is met by a granulation apparatus in accordance with the attached independent claims. The claims dependent thereon describe preferred or advantageous embodiments of the present invention, comprising further advantageous features.

BRIEF DESCRIPTION OF THE DRAWINGS

The features and advantages of the granulation apparatus will become apparent from the description below of some preferred embodiments, given by way of indicative and non-limiting example, with reference to the attached figures, wherein:

FIG. 2 shows a side view of the granulation apparatus of FIG. 1a;

DETAILED DESCRIPTION

With reference to the above figures, a granulation apparatus has been indicated as a whole with the reference numeral 1. Such a granulation apparatus is suitable for carrying out granulation operations on a stream of molten plastic material from an extruder.

In accordance with the present invention, the granulation apparatus 1 comprises:
- a fixed support 10 suitable for being rigidly constrained to a working base 1000 and extending along a vertical axis Z-Z, perpendicular to the working base 1000;
- a rotating support 11, connected in a rotatable manner to said fixed support 10, and actuatable in rotation around a first direction Z'-Z' either parallel or coincident to said vertical axis Z-Z;
- a die 9 suitable for being connected to an output flange 80 of an extruder;
- a cutting assembly 12, extending along a horizontal axis X-X substantially orthogonal to the vertical axis Z-Z, between a blade end 122 suitable for facing the die 9 and a motor end 121 opposite to the blade end 122 along the horizontal axis X-X; and
- connecting means 3 that constrain the cutting assembly 12 to the rotating support 11.

The cutting assembly 12 comprises:
- a blade assembly 22 in the vicinity of the blade end 122, comprising cutting blades 220 for cutting the molten plastic material exiting from the die 9;
- a motor 4 in the vicinity of the motor end 121, suitable for rotating the cutting blades 220 around the horizontal axis X-X; and
- a drive shaft 21 which extends mainly along the horizontal axis X-X between the motor 4 and the blade assembly 22, suitable for transmitting rotation from the motor 4 to the blade assembly 22.

According to one aspect of the present invention, the connecting means 3 comprise sliding means 3' suitable for allowing the relative translation between the cutting assembly 12 and the rotating support 11.

In accordance with the present invention, the cutting assembly 12 is constrained to the rotating support 11 by means of the connecting means 3 in such a way that, by means of the rotation of the rotating support 11, the cutting assembly 12 rotates around the first direction Z'-Z' between a working configuration L, in which the cutting assembly 12 is suitable for performing granulation operations on a stream of molten plastic material exiting from the die 9 along an exiting direction Y-Y of said stream of plastic material, and a rotated configuration R, in which the cutting assembly 12 is arranged so that the horizontal axis X-X is incident, preferably orthogonal, to the exiting direction Y-Y of said stream of molten plastic material.

In other words, preferably, the entire cutting assembly 12 is supported entirely by the rotating support 11 and is suitable for also rotating around the vertical axis Z-Z when the rotating support 11 is also rotating.

Preferably, the fixed support 10 is other than the extruder.

In other words, the cutting assembly 12 is supported only by the fixed support 10 and is independent from the extruder.

Even more preferably, the granulation apparatus 1 is stand-alone with respect to the extruder, i.e. the extruder is not itself the fixed support 10 for the granulation apparatus.

Therefore, the granulation apparatus can be applied for realizing granulating operation upon the exit of molten material from different types of extruders.

The granulation apparatus is not directly connected in rotatable manner to the extruder. The rotation of the cutting assembly 12 with respect to the extruder takes place indirectly, by means of the direct rotation of the cutting assembly with respect to the fixed support 10.

It is clear that, although not shown in the accompanying drawings, in one embodiment, the die 9 is otherwise constrained, for example to the ground, i.e. it is not constrained to rotate together with the cutting assembly 12 and the rotating support 11, or else it is constrained to the rotating support 11 but is not forced to rotate integrally therewith. Such a configuration makes it possible to separate the cutting assembly 12 from the die 9, allowing cleaning and/or maintenance operations to be performed on these components.

In one embodiment, the fixed support 10 is a substantially cylindrical pin, comprising a base portion, which is preferably enlarged, having a base face fixed to said working base 1000, and a head portion, which is preferably tapered.

Preferably, the rotating support 11 is a cylindrical or prismatic body, having a cavity that extends along the first direction Z'-Z' and is suitable for coupling to the head portion of the fixed support 10.

Preferably, the first direction Z'-Z' coincides with the vertical axis Z-Z.

Preferably, the cutting assembly 12 is suitable for rotating integrally with the rotating support 11.

Preferably, when in the rotated configuration R, the horizontal axis X-X of the cutting assembly 12 forms an angle of between 40° and 190°, preferably between 60 and 120°, preferably 90°, relative to the exiting direction Y-Y.

According to one embodiment, the rotating support 11 comprises a side wall 111 facing the sliding means 3' and the sliding means 3' comprise:
- horizontal sliding guides 30 extending predominantly along a second direction X'-X' substantially parallel to the horizontal axis X-X, integrally engaged with the side wall 111 of the rotating support 11; and
- horizontal sliding members 31, e.g. carriages, stably constrained to the cutting assembly 12 and slidable in the horizontal sliding guides 30. In such an embodiment, the cutting assembly 12 is actuatable so as to slide along the second direction X'-X'.

Preferably, the side wall 111 extends substantially parallel to the vertical axis Z-Z.

Even more preferably, the rotating support 11 is a cylinder that extends along the vertical axis Z-Z and the side wall 111 is at least one portion of the side mantle of the cylinder.

Preferably, when in the working configuration L, the cutting assembly 12 is suitable for sliding along the second direction X'-X' between an advanced position A, in which the blade end 122 is at least partially in contact with the die 9, and a retracted position B, in which the blade end 122 and the die 9 are separated from one another, i.e. are separated by an empty region.

In a particularly advantageous embodiment, the rotating support 11 is actuatable in rotation about the first direction Z'-Z' only when the cutting assembly 12 is in the retracted position B.

According to this embodiment variant, preferably, once the granulation operations have been performed, the cutting assembly 12 is driven so as to slide along the second direction X'-X' and taken from the advanced position A to the retracted position B.

Once the cutting assembly 12 is in the retracted position B, the rotating support 11 is driven in rotation around the first direction Z'-Z' in order to bring the cutting assembly 12 into the rotated configuration R. In this way, convenient access to the die 9 is permitted in order to perform cleaning and maintenance operations on the same.

It is clear that this embodiment, even if not shown in the figures, requires the die 9 to be constrained independently of the cutting assembly 12.

In a preferred embodiment, the cutting assembly 12 is supported in a cantilevered manner by the rotating support 11.

In other words, according to this embodiment, the cutting assembly 12 is supported entirely by the rotating support 11 which in turn is supported by the fixed support 10, without further support or ground support means, such as rails or support carriages.

Figure 1A:
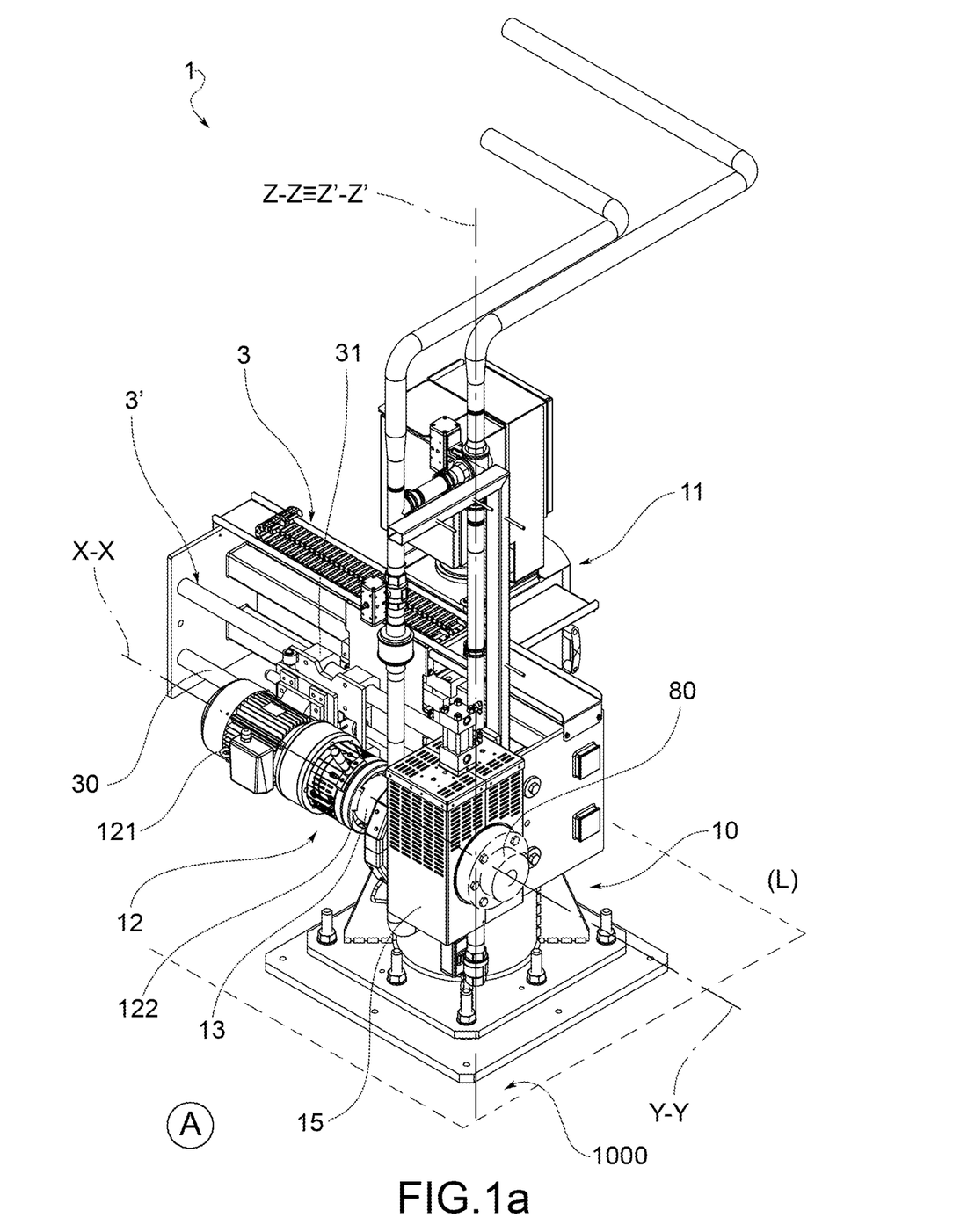
FIG. 1a shows a perspective view of a granulation apparatus in a preferred embodiment of the present invention, wherein the cutting assembly is in a working configuration, in a forward position.
Figure 1B:
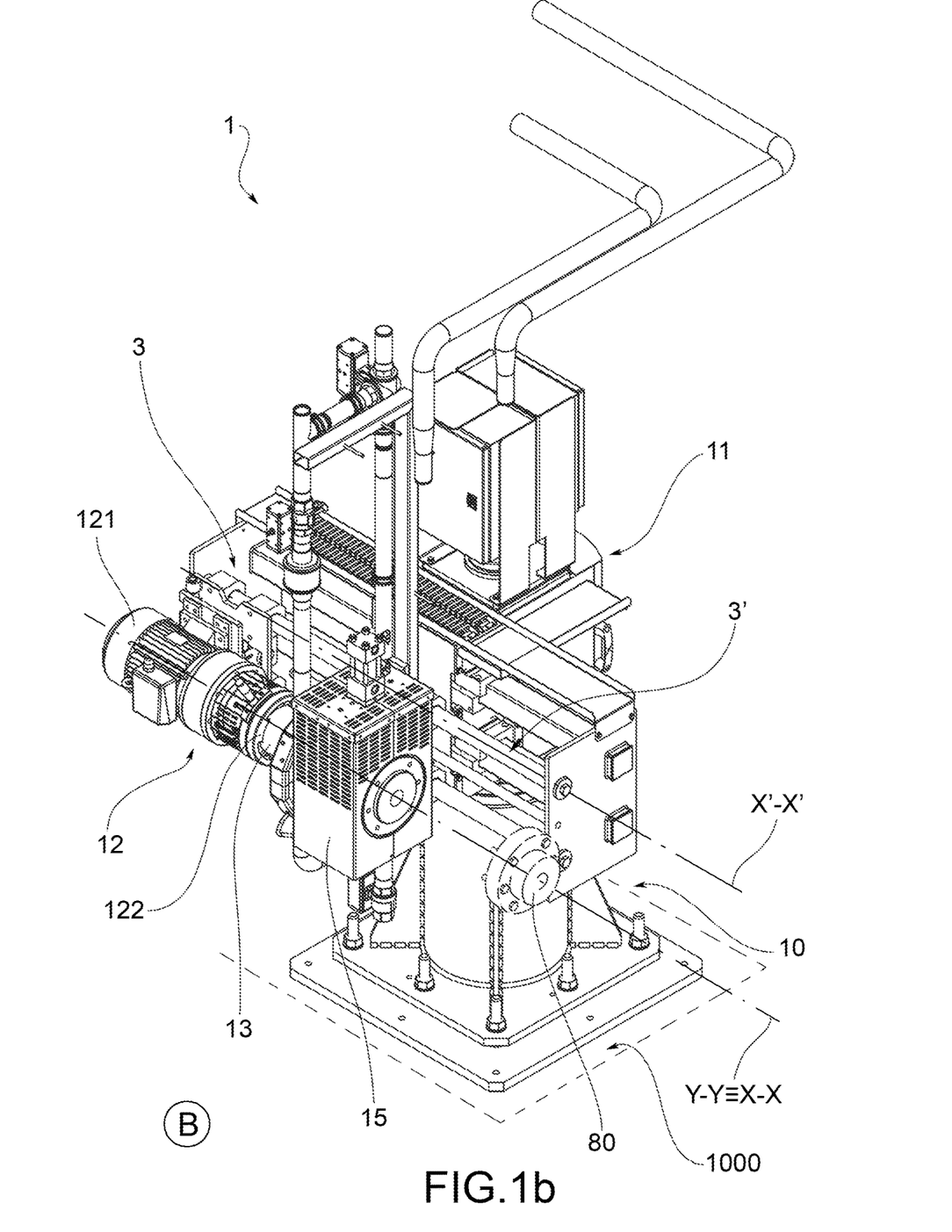
FIG. 1b shows a perspective view of a granulation apparatus in a preferred embodiment of the present invention, wherein the cutting assembly is in a working configuration, in a retracted position.
Figure 1C:
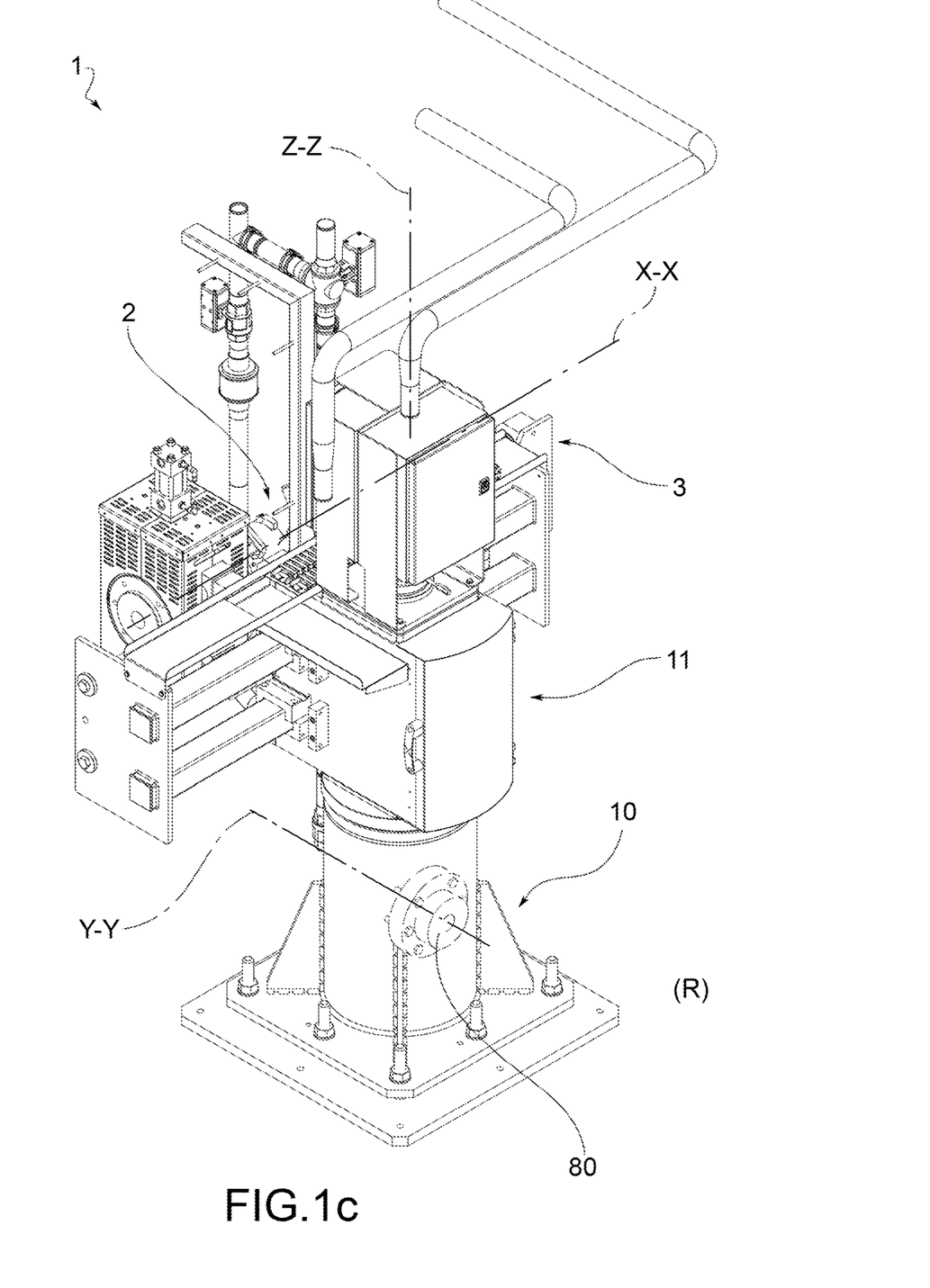
FIG. 1c shows a perspective view of a granulation apparatus in a preferred embodiment of the present invention, wherein the cutting assembly is in a rotated configuration, in a retracted position.
Figure 2:
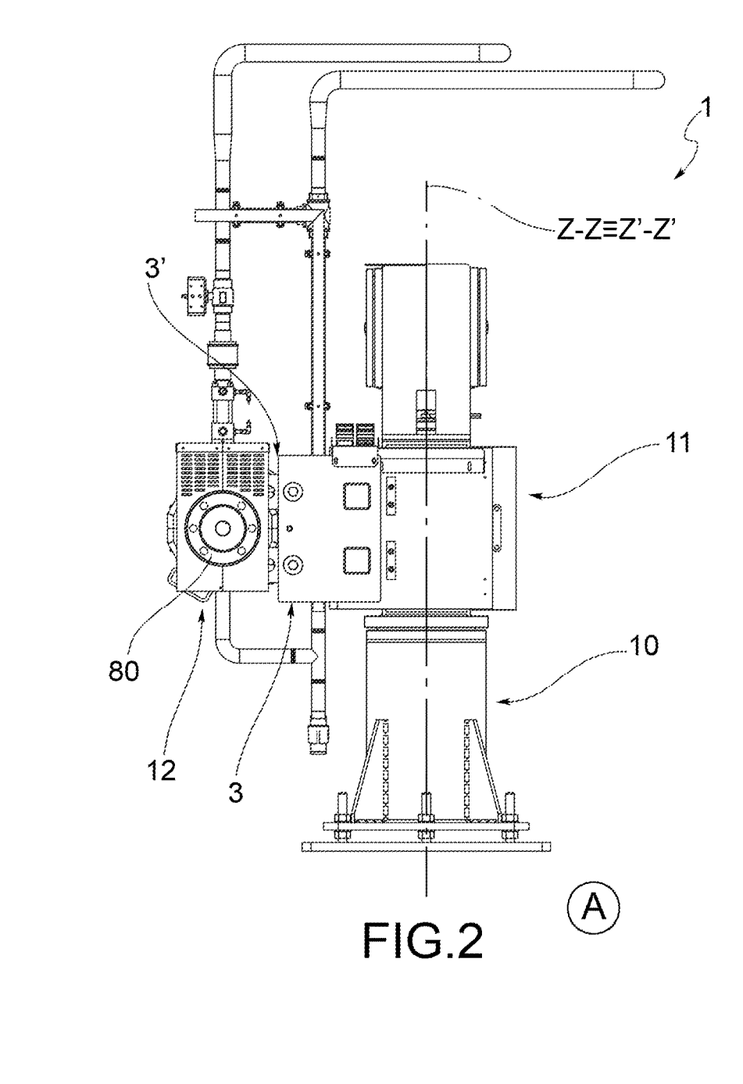
Figure 3A:
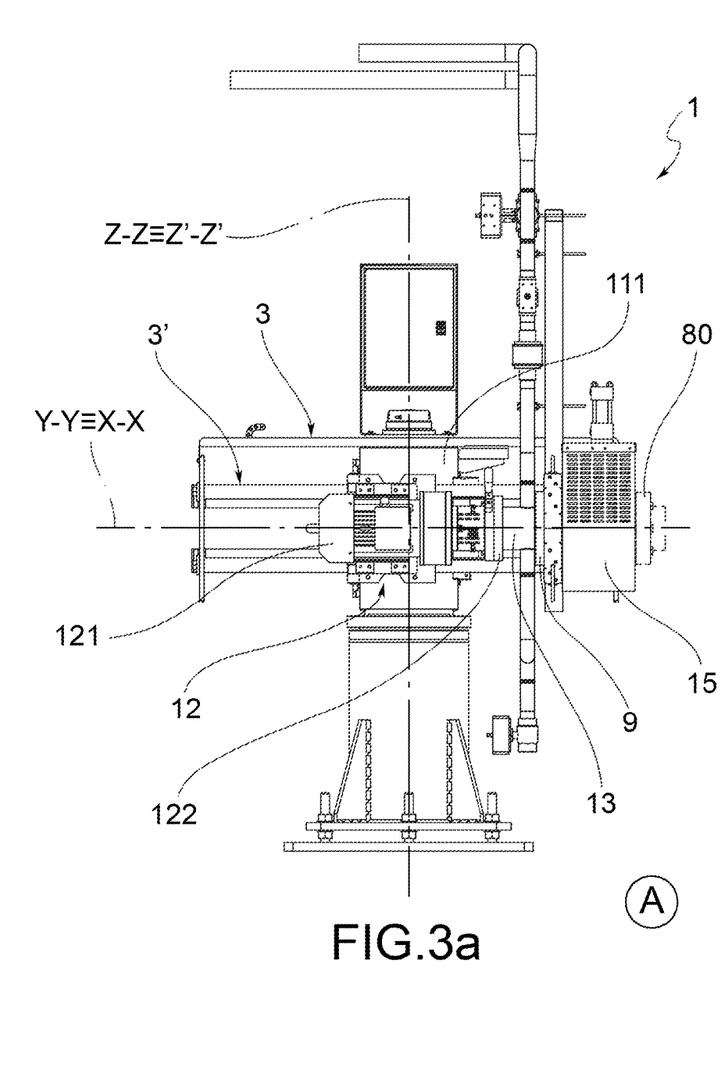
FIGS. 3a, 3b and 3c are front views of the granulation apparatus of FIGS. 1a, 1b and 1c, respectively.
Figure 3B:
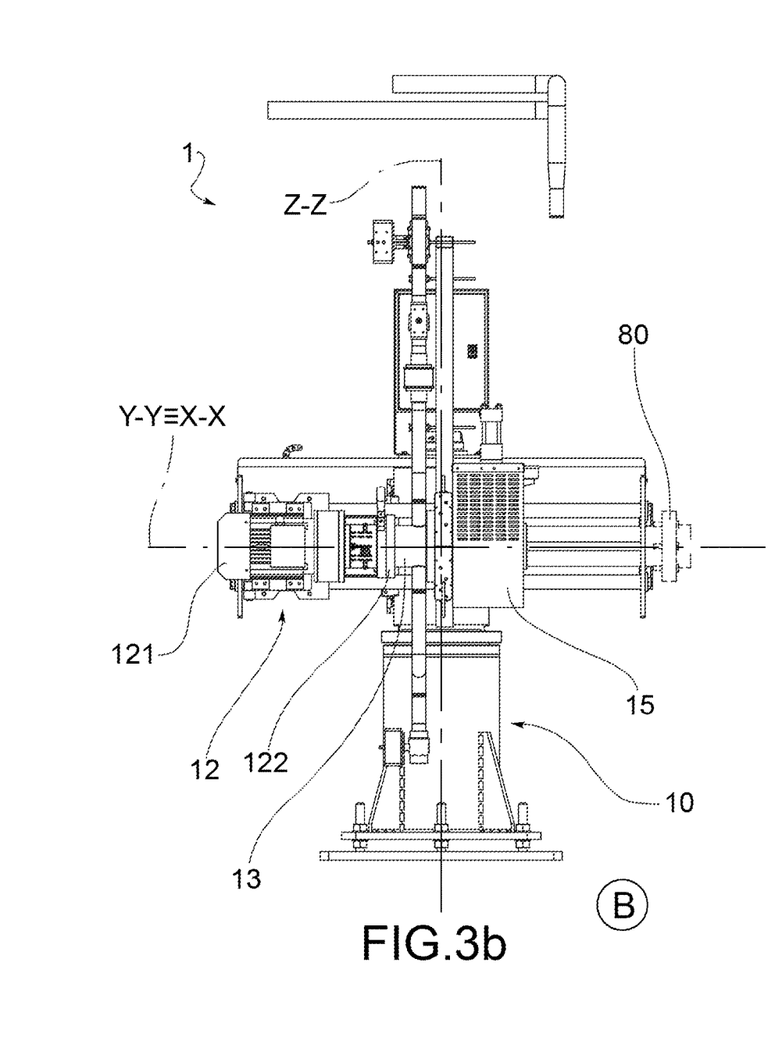
Figure 3C:
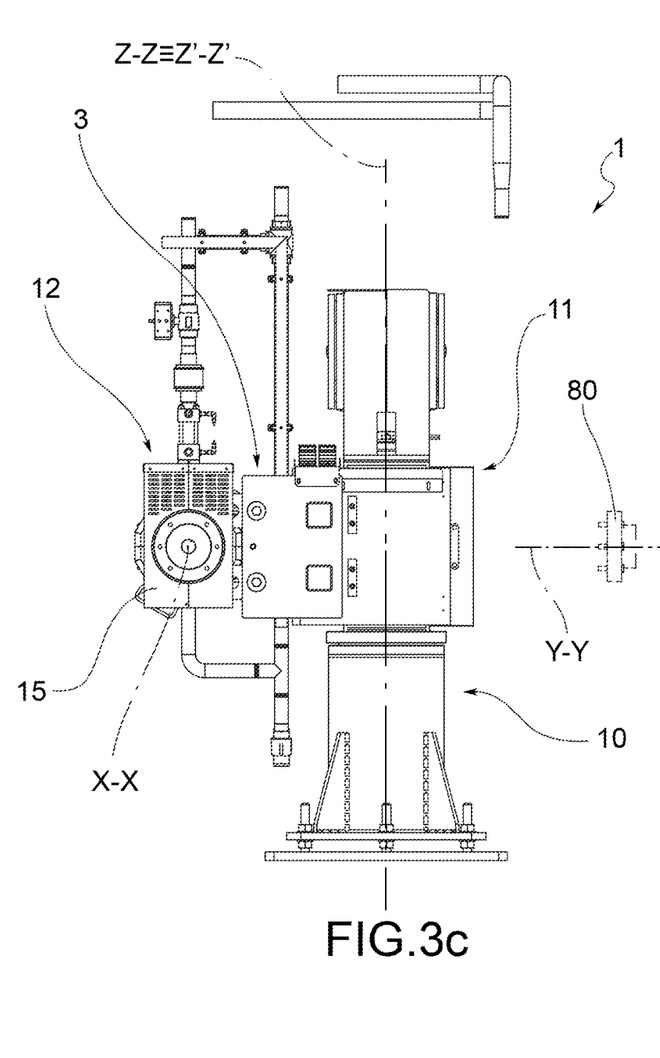
Figure 4A:
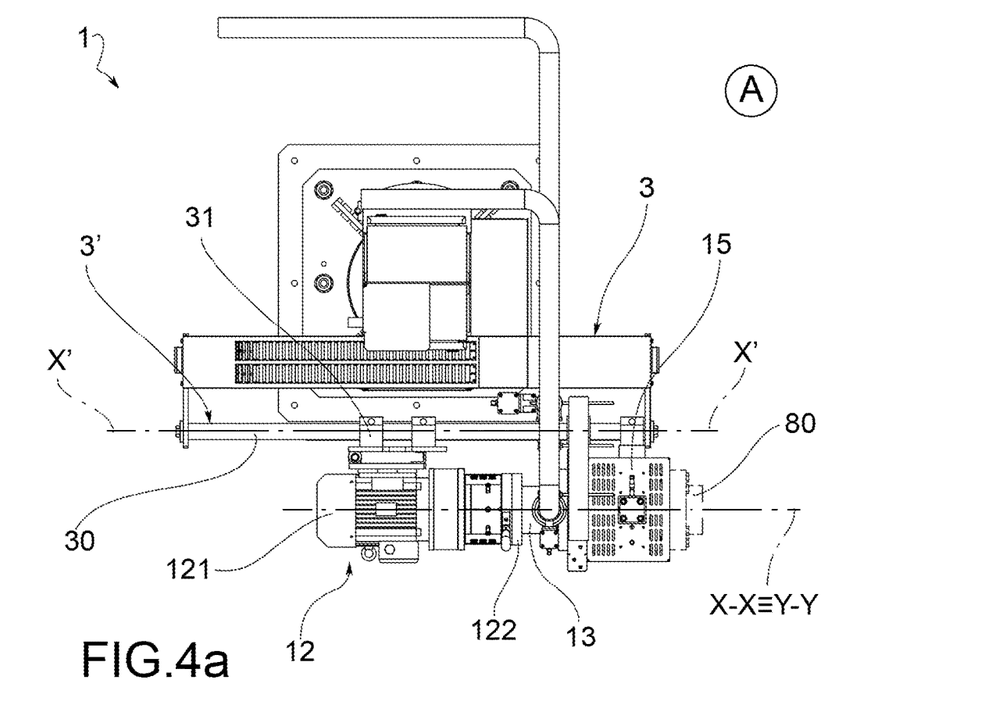
FIGS. 4a, 4b and 4c are plan views, from above, of the granulation apparatus of FIGS. 1a, 1b and 1c, respectively.
Figure 4B:
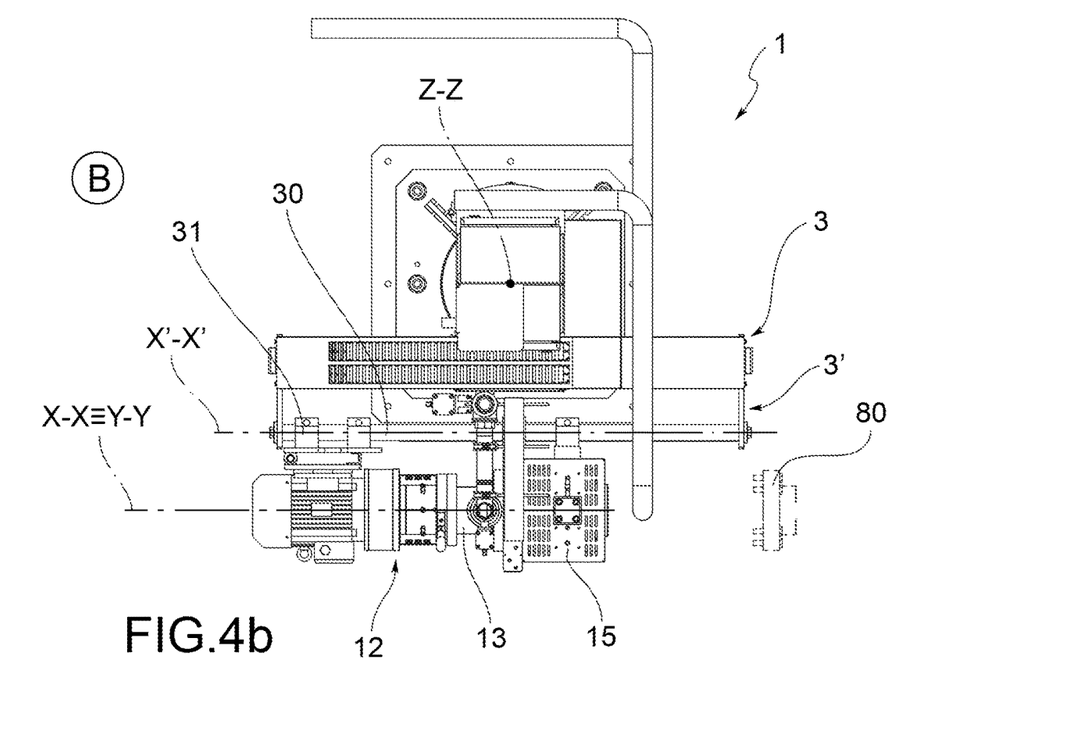
Figure 4C:
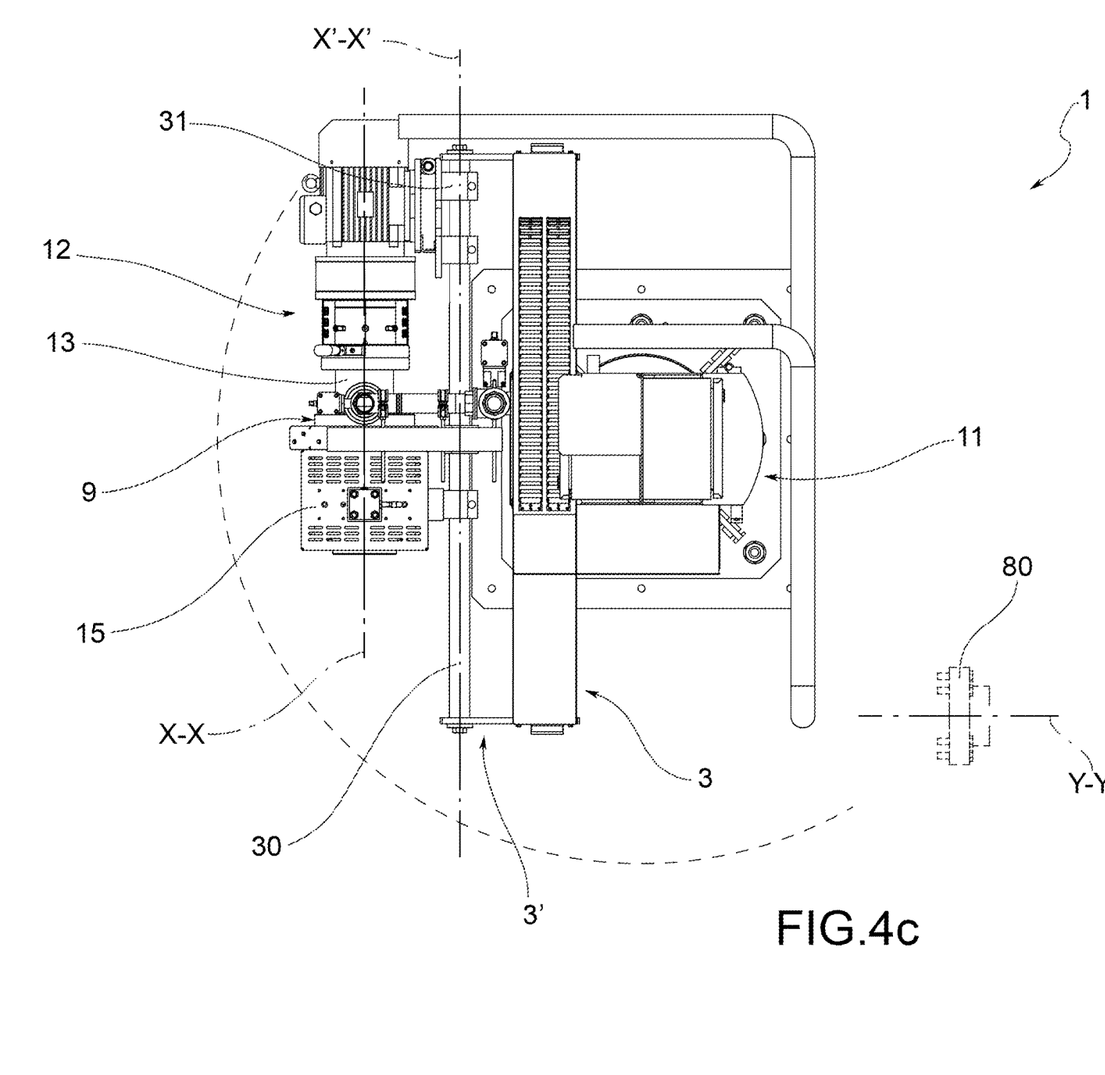
Figure 5:
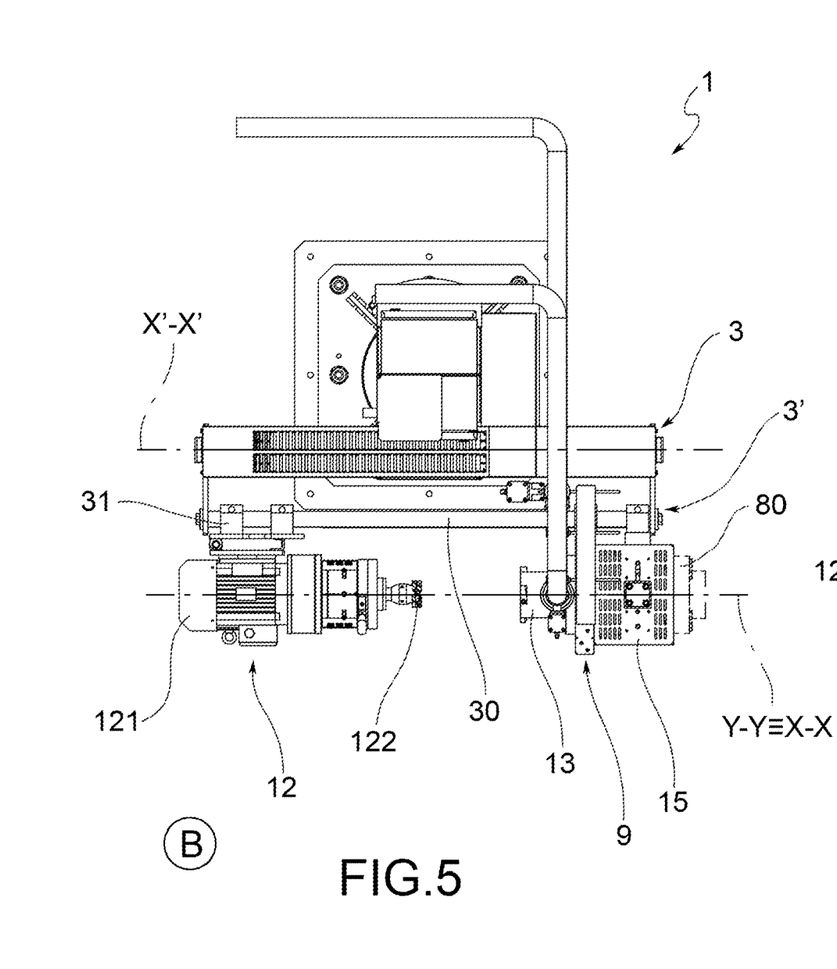
FIG. 5 shows a top plan view of a granulation apparatus in one embodiment of the present invention, wherein the cutting assembly is in a working configuration, in a retracted position.
Figure 6:
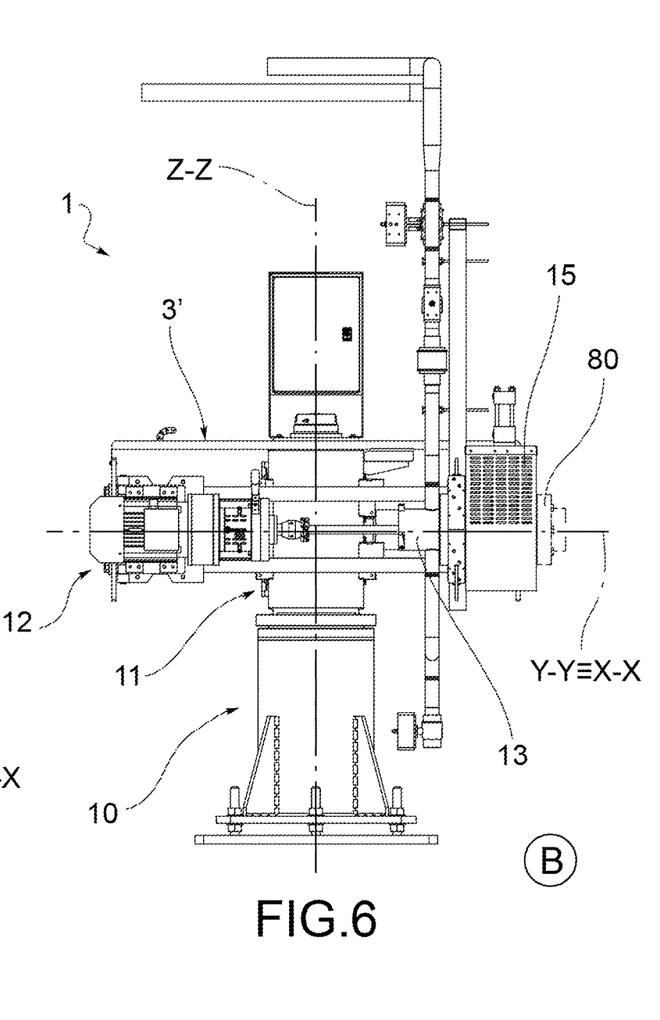
FIG. 6 shows a front view of the granulation apparatus of FIG. 5.
Figure 7:
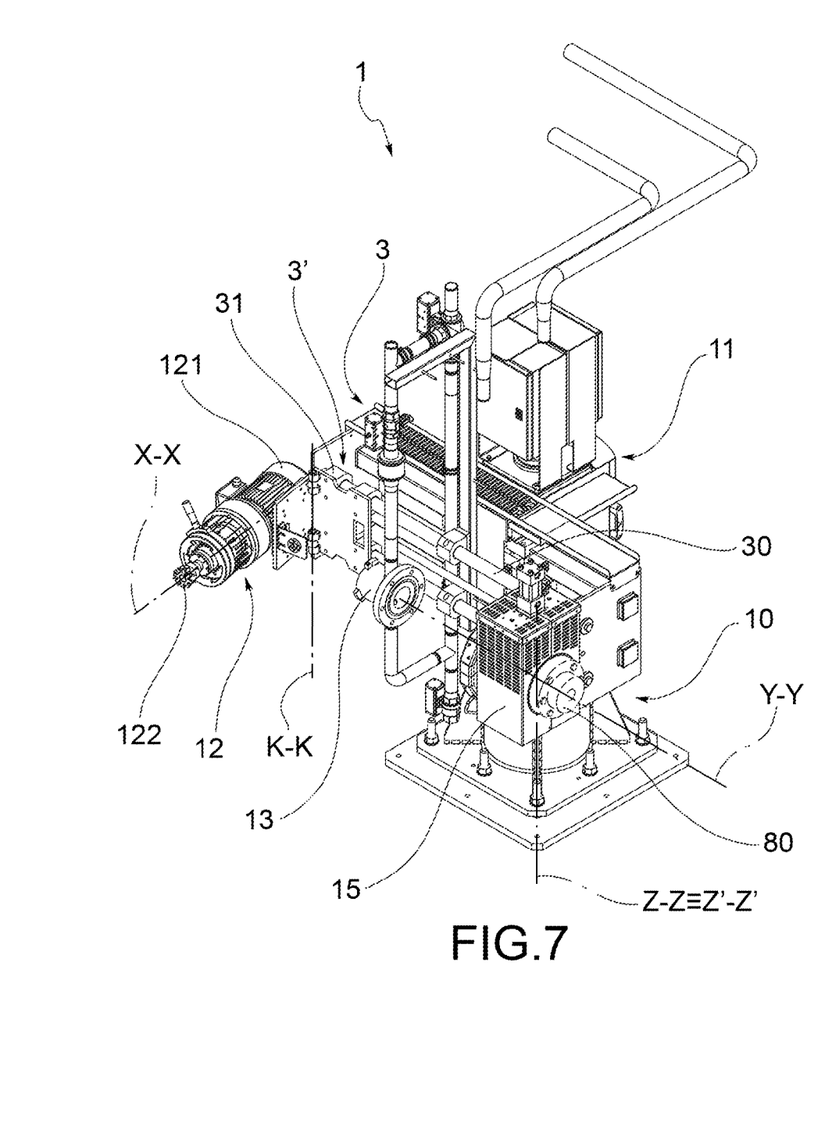
FIG. 7 shows a perspective view of a granulation apparatus in one embodiment of the invention, wherein the cutting assembly, the granulation chamber and the die are separated from one another along the sliding means and wherein the cutting assembly is in turn rotated relative to a third direction K-K.
Figure 8:
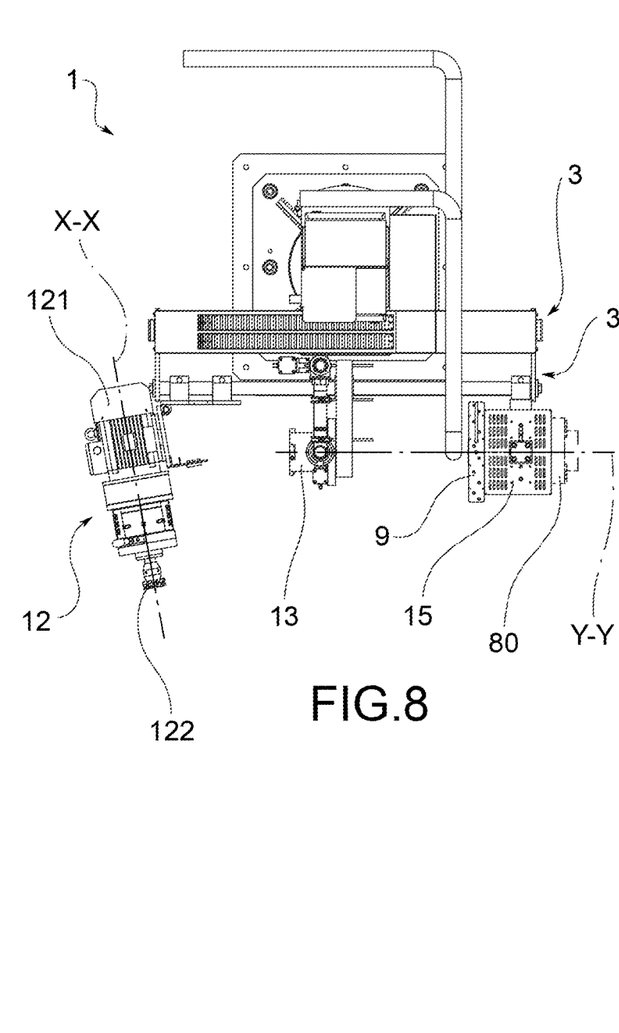
FIG. 8 shows a plan view of the granulation apparatus of FIG. 7.

In one embodiment of the present invention, for example in the embodiment shown in FIGS. 7 and 8, furthermore, the cutting assembly 12 is in turn constrained to the rotating support 11 in a rotatable manner, for example by means of flat hinges.

In other words, in such an embodiment, the cutting assembly 12 is also rotatable relative to a third direction K-K parallel to the vertical axis Z-Z. The third direction K-K preferably passes through the flat hinges and defines the axis of rotation of the flat hinges.

Figure 9:
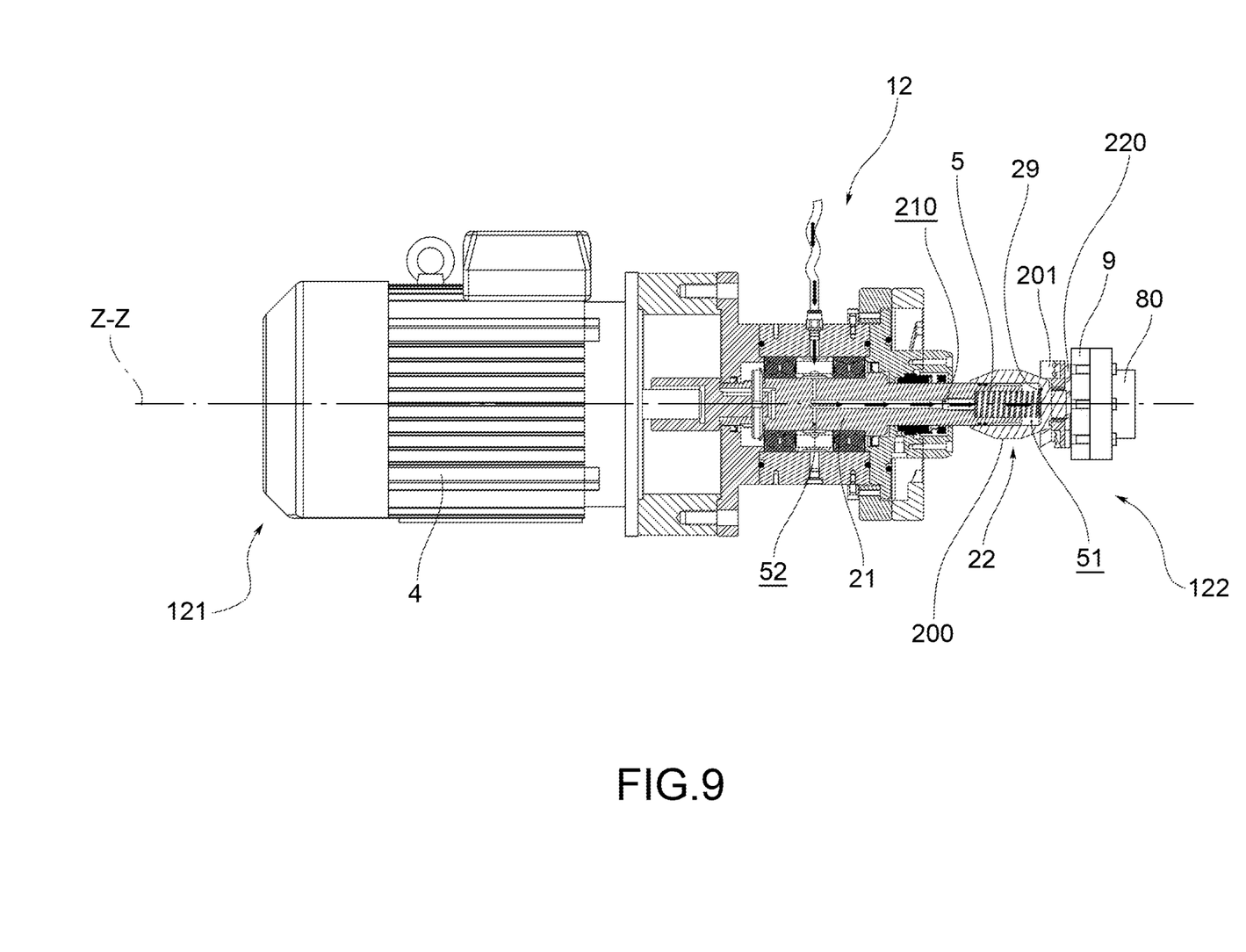
FIG. 9 shows a longitudinal sectional view of the cutting assembly of FIG. 2, along the section plane A-A.

In a particularly advantageous embodiment, the blade assembly 22 is engaged on the drive shaft 21 so as to integrally rotate about the horizontal axis X-X and translate along the horizontal axis X-X.

Preferably, the cutting assembly 12 comprises an elastic element 5 connected between the drive shaft 21 and the blade assembly 22 in order to keep the cutting blades 220 in pressure contact on the die 9.

In a preferred embodiment, the blade assembly 22 comprises a propeller support 200 removably pivoted upon the drive shaft 21, and a blade holding propeller 201 housed on said propeller support 200. The cutting blades 220 are engaged with said blade holding propeller 201.

Preferably, between the blade assembly 22 and the drive shaft 21 there is a pressure cavity 51 that is suitable for receiving compressed air from a compressed air inlet opening 52 located on the drive shaft 21, so that the cutting blades 220 are kept in pressure contact on the die 9 by means of the effect of the compressed air within the pressure cavity 51, in parallel with the action exerted by the elastic element 5.

In other words, the pressure action of the compressed air is exerted parallel to the elastic return action of the elastic element 5, so that the overall pressure exerted on the blade assembly 22 is equal to the sum of the individual pressure contributions exerted respectively by the elastic element 5 and by the compressed air within said pressure cavity 52.

In a preferred embodiment, a channel 210 is formed on the drive shaft 21 that is suitable for allowing the passage of compressed air along the horizontal axis X-X towards a transverse wall 290 of the blade assembly 22.

In one advantageous embodiment, the channel 210 is formed only within one portion of the drive shaft 21 downstream of the motor 4.

In other words, the channel 210 preferably remains outside the crankshaft or the power take-off of the crankshaft.

Preferably, the channel 210 extends up to the transverse wall 290 and is blind on the opposite side to the blade assembly 22.

According to an advantageous variant, the granulation apparatus 1 also comprises a granulation chamber 13 suitable for containing at least one portion of the blade end 122 of the cutting assembly 12.

Preferably, the granulation chamber 13 is suitable for containing the cutting blades 220 supported by the blade holding propeller 201.

The granulation chamber 13 is preferably cylindrical, extending along the horizontal axis X-X between the die 9 and a hollow transverse wall opposite the die 9, in order to allow for the axial insertion of the blade end 122 of the cutting assembly 12.

The granulation chamber 13 is suitable for enclosing the blade end 122, so as to collect the granules cut by the blade assembly during the granulation process.

Preferably, the granulation chamber 13 is constrained to the rotating support 11 in such a way that, by means of the rotation of the rotating support 11, the granulation chamber 13 also rotates around the first direction Z'-Z'.

In one embodiment of the present invention, the granulation chamber 13 is also constrained to the rotating support 11 by the sliding means 3', so as to also allow for the relative translation of the granulation chamber 13 relative to the rotating support 11.

Preferably, the granulation chamber 13 is free to slide on the sliding means 3' independently of the cutting assembly 12. In this variant, access to the granulation chamber is permitted, for example in order to clean the residues of molten plastic material.

Preferably, the granulation apparatus 1 also comprises a water supply assembly, suitable for supplying water to the granulation chamber 13 in such a way as to cool and solidify the granules obtained as a result of the granulation operations, and to transport them to an output mouth of the granulation apparatus 1 in order to undergo further treatment following processing.

In an advantageous embodiment, the die 9 is constrained to the rotating support 11 in such a way that, by means of the rotation of the rotating support 11, the die 9 also rotates around the first direction Z'-Z'.

Furthermore, preferably, the die 9 is also constrained to the rotating support 11 by the sliding means 3', so as to also allow for the relative translation of the die 9 relative to the rotating support 11.

Preferably, the die 9 is free to slide on the sliding means 3' independently of the cutting assembly 12 and/or the granulation chamber 13.

In this variant, access to the output flange 80 is allowed in order to carry out ordinary and extraordinary maintenance and replacement operations.

In a preferred embodiment, the cutting assembly 12, the granulation chamber 13 and the die 9 are suitable for rotating integrally with one another and with the rotating support 11 around the first direction Z'-Z'.

This embodiment allows the assembly of the cutting assembly 12, granulation chamber 13 and die 9 to be rotated in an agile and simple manner, thus also allowing for access to the extruder flange for cleaning, maintenance and possible replacement.

Preferably, furthermore, the die 9 and the granulation chamber 13 are also supported in a cantilevered manner by the rotating support 11.

According to an advantageous embodiment, the cutting assembly 12, the granulation chamber 13 and the die 9 are slidable in an integral manner along the second direction X'-X'.

According to an equally advantageous alternative embodiment, the cutting assembly 12, the granulation chamber 13 and the die 9 are slidable along the second direction X'-X' in an independent manner. In this way, the separation of the three aforementioned components and access to each thereof, in order to perform maintenance operations, is made possible.

Preferably, moreover, the granulation apparatus 1 also comprises a diverter valve 15, which connects the die 9 and the output flange 80 of the extruder.

Preferably, the diverter valve 15 is interposed therebetween and is suitable for directing the stream of molten material from the output flange 80 of the extruder to the die 9 only under the necessary operating conditions, for example when the molten plastic material is at a temperature that is sufficient to undergo the granulation operations.

In an advantageous embodiment, also the diverter valve 15 is constrained to the rotating support 11 in such a way that, by means of the rotation of the rotating support 11, the diverter valve 15 also rotates around the first direction Z'-Z'.

In one embodiment of the present invention, the diverter valve 15 is also constrained to the rotating support 11 by the sliding means 3', so as to also allow for the relative translation of the diverter valve 15 with respect to the rotating support 11 along the second direction X'-X'.

Preferably, the diverter valve 15 is suitable for sliding on the sliding means 3' independently of the cutting assembly 12 and/or the granulation chamber 13 and/or the die 9.

In a preferred embodiment, shown in the figures, the cutting assembly 12, the granulation chamber 13, the die 9 and the diverter valve 15 are suitable for being rotated integrally therebetween and with the rotating support 11 around the first direction Z'-Z'.

This embodiment makes it possible to rotate the cutting assembly 12, the granulation chamber 13, the die 9 and the diverter valve 15 in an agile and simple manner, thereby allowing access to the extruder flange for cleaning, maintenance and possible replacement.

Preferably, moreover, the diverter valve is also supported in a cantilevered manner by the rotating support 11.

Preferably, the entire assembly of the cutting assembly 12, die 9, granulation chamber 13 and diverter valve 15 is supported in a cantilevered manner by the rotating support.

According to an advantageous embodiment, the cutting assembly 12, the granulation chamber 13 and the die 9 are slidable in an integral manner along the second direction X'-X'.

This embodiment variant makes it possible to simultaneously move all of the components of the granulation system involved in the cutting of the plastic material, comfortably and with one or at most two handling operations. This allows for access to the extruder output flange.

According to one aspect of the present invention, also provided is a granulation apparatus 1 for the granulation of a plastic material, comprising:
 a fixed support 10 suitable for being rigidly constrained to a working base and extending along a vertical axis Z-Z, perpendicular to the working base;
 a rotating support 11, connected in a rotatable manner to the fixed support 10, and actuatable in rotation about a first direction Z'-Z' either parallel or coincident with the vertical axis Z-Z;
 a die 9 suitable for being connected to an output flange 80 of an extruder;
 a cutting assembly 12, extending along a horizontal axis X-X substantially orthogonal to the vertical axis Z-Z, between a blade end 122 suitable for facing the die 9 and a motor end 121 opposite the blade end 122; and
 connecting means 3 that constrain the cutting assembly 12 to the rotating support 11.

According to a further aspect of the present invention, the connecting means 3 constrain the cutting assembly 12 to the rotating support 11 in such a way that, by means of the rotation of the rotating support 11, the cutting assembly 12 rotates around the first direction Z'-Z' between a working configuration L, in which the cutting assembly 12 is suitable for performing granulation operations on a stream of molten plastic material exiting from the die 9 along an exiting direction Y-Y, and a rotated configuration R, in which the cutting assembly 12 is arranged with the horizontal axis X-X incident, preferably orthogonal, to the exiting direction Y-Y of said stream of molten plastic material from the die 9.

According to one aspect of the present invention, the cutting assembly 12 is supported in a cantilevered manner by the rotating support 11.

In one embodiment of the present invention, the rotating support 11 is connected in a rotatable manner to the fixed support 10 by engaging with a fifth wheel.

Preferably, the fixed support 10 acts as a pivot for the rotation of the rotating support 11. In other words, in such an embodiment, the rotating support 11 is hinged on the fixed support along the vertical axis Z-Z, that is to say, the rotating support has a cavity extending mainly along the vertical axis Z-Z, suitable for accommodating at least a portion of the fixed support.

Preferably, the cavity is blind along the vertical axis Z-Z.

Alternatively, the cavity passes along the vertical axis Z-Z, i.e. the rotating support 11 is a solid, a prism or a hollow cylinder along the vertical axis Z-Z.

The present invention also provides a maintenance method for a granulation apparatus according to the aspects of the present invention, comprising the following steps:
 f) interrupting the processing and separating the cutting assembly 12 from the output flange 80 of the extruder;
 g) rotating the rotating support 11 and bringing the cutting assembly 12 into the rotated configuration R; and
 h) performing cleaning and/or maintenance operations on the cutting assembly 12 and/or on the die 9.

The term "separating" in this discussion refers to an operation as a result whereof the cutting assembly 12 and the output flange 80 are no longer functionally connected.

In an embodiment, after step g), the cutting assembly 12 in rotated configuration R is completely separated from the extruder. In other words, the cutting assembly 12 in the rotated configuration R is not supported by the extruder.

It is clear that this configuration comprises the simplest case in which the cutting assembly 12 and the die 9 remain connected to one another and are disconnected from the output flange 80.

It is also clear that such a configuration includes the intermediate case in which the die 9 and the output flange 80 remain connected to one another and are disconnected from the cutting assembly 12.

It is also clear that such a configuration also comprises the additional case in which the cutting assembly 12, the die 9 and the output flange 80 are all disconnected.

It is equally clear, although not shown in the attached figures, that the separation and rotation of the cutting assembly 12 from the die 9 is permitted when the die 9 is independently constrained by the cutting assembly 12, for example when it is supported by auxiliary support means, for example on the ground.

It is clear that in the embodiment variants implemented above wherein the granulation apparatus also comprises a diverter valve 15 and a granulation chamber 13 that are also constrained to the rotating support 11 in order to rotate integrally therewith, and wherein the die 9 is also constrained to the rotating support 11 in order to rotate integrally therewith, in step f) of the maintenance method the separation of the cutting assembly 12 from the output flange 80 implies that the diverter valve 15 is directly separated from the output flange of the extruder 80.

Preferably, the connecting means 3 comprise sliding means 3' that are suitable for allowing the relative translation between the cutting assembly 12 and the rotating support 11 between an advanced position A and a retracted position B.

Preferably, between step f) and step g) said method comprises the step of:
- f1) on the sliding means 3', actuating the sliding of the cutting assembly 12 and bringing it to the retracted position B.

It is clear that in the design variants described above wherein the granulation apparatus also comprises a diverter valve 15 and a granulation chamber 13 suitable for sliding with the die 9 and the cutting assembly 12 along the second direction X'-X' by means of the sliding means 3', step f) of the maintenance method also comprises step f2), wherein, on the sliding means 3', actuating the sliding of the granulation chamber 13, the die 9 and the diverter valve 15 in an integral manner with the cutting assembly 12 is envisaged. This variant allows access to the output flange 80 in order to also perform the cleaning and maintenance thereof. In other words, the granulation apparatus thus shaped is suitable for easily being moved in order to access the extruder flange and possibly the diverter valve.

A further subject of the present invention is a granulation method for a molten plastic material, comprising the following steps:
- a) providing a granulation apparatus 1 according to the present invention, a die 9 and an extruder;
- b) operatively connecting the die to an output flange 80 of the extruder;
- c) bringing the cutting assembly 12 into the working configuration L;
- d) bringing the blade end 122 of the cutting assembly 12 at least partially into contact with the die 9;
- e) granulating the molten plastic material exiting from the die; and
- f) maintaining the granulation apparatus by means of the maintenance method according to the present invention, as described in the preceding paragraphs.

It is an object of the present invention also a granulating system comprising a granulation apparatus 1 according to an embodiment of the present invention, and an extruder. According to an aspect of the invention, the granulating apparatus 1 is completely separated from the extruder when the cutting assembly 12 is in the rotated configuration R.

Innovatively, the granulation apparatus and the granulation method described above largely fulfill the purpose of the present invention in overcoming typical problems of the prior art.

In fact, the present invention makes it possible to support the cutting assembly and the other components of the granulation apparatus by means of the sole support of the rotating support, in turn supported by the fixed support.

Advantageously, the cantilevered suspension of the cutting assembly relative to the rotating support does not require external support structures, such as rails or carriages, for the displacement thereof.

Advantageously, such a configuration makes it possible to reduce the floor space requirements, and in the region of space around the granulation apparatus itself.

Advantageously, fixing by means of rigid elements of the fixed ground support increases the reliability of the apparatus and prevents deformations or misalignments of the cutting assembly.

Furthermore, the presence of the sliding means makes it possible for the cutting assembly and the additional components that may be present in the granulator, such as the granulation chamber, the die and the diverter valve, to be easily moved relative to the rotating support, keeping them in axis therebetween and distributing the load more efficiently.

Moreover, the aforementioned components, by virtue of the sliding means, may be separated from one another in a comfortable and functional way, allowing access to each component of the granulation apparatus in order to perform cleaning and maintenance operations or the replacement of damaged parts.

According to a further advantage, the loads to be moved in order to access the components of the granulation apparatus are reduced.

In addition, advantageously, the granulation apparatus is suitable for allowing convenient access to the extruder output flange for cleaning and maintenance operations.

Furthermore, advantageously, the moving of the components of the granulation apparatus is also permitted in small spaces and does not require large free volumes.

What is claimed is:

1. A granulation apparatus for granulating a plastic material, the granulation apparatus comprising:
   a fixed support suitable for being rigidly constrained to a working base and extending along a vertical axis (Z-Z), perpendicular to the working base;
   a rotating support, connected in a rotatable manner to the fixed support, and actuatable in rotation about a first direction (Z'-Z') either parallel or coincident to the vertical axis (Z-Z);
   a die suitable for being connected to an output flange of an extruder;
   a cutting assembly, extending along a horizontal axis (X-X), substantially orthogonal to the vertical axis (Z-Z), between a blade end suitable for facing the die and a motor end opposite to the blade end along the horizontal axis (X-X),
   the cutting assembly comprising a motor and a blade assembly comprising cutting blades suitable for being put into rotation by the motor for cutting molten plastic material exiting from the die; and
connecting means that constrain the cutting assembly to the rotating support;
   wherein the connecting means comprise sliding means suitable for allowing relative translation between the cutting assembly and the rotating support, and
   wherein the connecting means constrain the cutting assembly to the rotating support so that by rotation of the rotating support, the cutting assembly rotates about the first direction (Z'-Z') between a working configuration, in which the cutting assembly is suitable for performing granulation operations on a stream of molten plastic material exiting from the die along an exiting direction (Y-Y) of the stream of plastic material, and a rotated configuration in which the cutting assembly is arranged so that the horizontal axis (X-X) is incident to the exiting direction (Y-Y) of the stream of molten plastic material.

2. The granulation apparatus of claim 1, wherein in the rotated configuration, the cutting assembly is arranged so that the horizontal axis (X-X) is orthogonal to the exiting direction (Y-Y) of the stream of molten plastic material.

3. The granulation apparatus of claim 1, wherein the cutting assembly is suitable for rotating integrally with the rotating support.

4. The granulation apparatus of claim 1, wherein the rotating support comprises a side wall that faces the sliding means and the sliding means comprise:
horizontal sliding guides extending predominantly along a second direction (X'-X') substantially parallel to the horizontal axis (X-X), integrally engaged with the side wall of the rotating support; and
horizontal sliding members stably constrained to the cutting assembly and slidable in the horizontal sliding guides; so that the cutting assembly is actuatable in sliding along the second direction (X'-X').

5. The granulation apparatus of claim 4, wherein the horizontal sliding members are carriages.

6. The granulation apparatus of claim 4, wherein, when in the working configuration, the cutting assembly is suitable for sliding along the second direction (X'-X') between an advanced position, in which the blade end is at least partially in contact with the die, and a retracted position, in which the blade end and the die are separated.

7. The granulation apparatus of claim 6, wherein the rotating support is actuatable in rotation about the first direction (Z'-Z') only when the cutting assembly is in the retracted position.

8. The granulation apparatus of claim 1, wherein the cutting assembly is supported cantilevered by the rotating support.

9. The granulation apparatus of claim 1, further comprising a granulation chamber suitable for containing at least one portion of the blade end of the cutting assembly, the granulation chamber being constrained to the rotating support so that the granulation chamber also rotates about the first direction (Z'-Z') by means of rotation of the rotating support.

10. The granulation apparatus of claim 9, wherein the sliding means are suitable for also allowing relative translation of the granulation chamber relative to the rotating support.

11. The granulation apparatus of claim 1, wherein also the die is constrained to the rotating support so that the die also rotates about the first direction (Z'-Z') by means of rotation of the rotating support.

12. The granulation apparatus of claim 11, wherein the sliding means are suitable for also allowing relative translation of the die along a second direction (X'-X') relative to the rotating support.

13. The granulation apparatus of claim 11, wherein the granulation apparatus further comprises a granulation chamber suitable for containing at least one portion of the blade end of the cutting assembly, the granulation chamber being constrained to the rotating support so that the granulation chamber also rotates about the first direction (Z'-Z') by means of rotation of the rotating support, and wherein the cutting assembly, the granulation chamber and the die are suitable for rotating integrally with each other and with the rotating support about the first direction (Z-Z).

14. The granulation apparatus of claim 11, wherein the granulation apparatus further comprises a granulation chamber suitable for containing at least one portion of the blade end of the cutting assembly, the granulation chamber being constrained to the rotating support so that the granulation chamber also rotates about the first direction (Z'-Z') by means of rotation of the rotating support, and wherein the die and the granulation chamber are also supported cantilevered by the rotating support.

15. A granulation apparatus for granulating a plastic material, the granulation apparatus comprising:
a fixed support suitable for being rigidly constrained to a working base and extending along a vertical axis (Z-Z), perpendicular to the working base;
a rotating support, connected in a rotatable manner to the fixed support, and actuatable in rotation about a first direction (Z'-Z') either parallel or coincident to the vertical axis (Z-Z);
a die suitable for being connected to an output flange of an extruder;
a cutting assembly, extending along a horizontal axis (X-X), substantially orthogonal to the vertical axis (Z-Z), between a blade end suitable for facing the die and a motor end opposite to the blade end along the horizontal axis (X-X),
the cutting assembly comprising a motor and a blade assembly comprising cutting blades suitable for being actuated in rotation by the motor for cutting molten plastic material exiting from the die; and
connecting means that constrain the cutting assembly to the rotating support;
wherein the connecting means constrain the cutting assembly to the rotating support so that by rotation of the rotating support, the cutting assembly rotates about the first direction (Z'-Z') between a working configuration, in which the cutting assembly is suitable for performing granulation operations on a stream of molten plastic material exiting from the die along an exiting direction (Y-Y) of the stream of plastic material, and a rotated configuration in which the cutting assembly is arranged so that the horizontal axis (X-X) is incident to the exiting direction (Y-Y) of the stream of molten plastic material, and
wherein the cutting assembly is supported cantilevered by the rotating support.

16. The granulation apparatus of claim 15, wherein in the rotated configuration, the cutting assembly is arranged so that the horizontal axis (X-X) is orthogonal to the exiting direction (Y-Y) of the stream of molten plastic material.

17. A maintenance method of a granulation apparatus for granulating a plastic material, the granulation apparatus comprising:
a fixed support suitable for being rigidly constrained to a working base and extending along a vertical axis (Z-Z), perpendicular to the working base;
a rotating support, connected in a rotatable manner to the fixed support, and actuatable in rotation about a first direction (Z'-Z') either parallel or coincident to the vertical axis (Z-Z);
a die suitable for being connected to an output flange of an extruder;
a cutting assembly, extending along a horizontal axis (X-X), substantially orthogonal to the vertical axis (Z-Z), between a blade end suitable for facing the die and a motor end opposite to the blade end along the horizontal axis (X-X),
the cutting assembly comprising a motor and a blade assembly comprising cutting blades suitable for being put into rotation by the motor for cutting molten plastic material exiting from the die; and
connecting means that constrain the cutting assembly to the rotating support;

wherein the connecting means comprise sliding means suitable for allowing relative translation between the cutting assembly and the rotating support, and wherein the connecting means constrain the cutting assembly to the rotating support so that by rotation of the rotating support, the cutting assembly rotates about the first direction (Z'-Z') between a working configuration, in which the cutting assembly is suitable for performing granulation operations on a stream of molten plastic material exiting from the die along an exiting direction (Y-Y) of the stream of plastic material, and a rotated configuration in which the cutting assembly is arranged so that the horizontal axis (X-X) is incident to the exiting direction (Y-Y) of the stream of molten plastic material, the maintenance method comprising:

f) interrupting processing and separating the cutting assembly from the output flange of the extruder;

g) rotating the rotating support and bringing the cutting assembly into the rotated configuration; and h) performing cleaning and/or maintenance operations on the cutting assembly and/or the die.

18. The maintenance method of claim 17, wherein the sliding means are suitable for allowing relative translation between the cutting assembly and said rotating support between an advanced position and a retracted position, and wherein, between step f) and step g), the maintenance method comprises:

f1) on the sliding means, actuating sliding of the cutting assembly and taking the cutting assembly to the retracted position.

19. A maintenance method of a granulation apparatus for granulating a plastic material, the granulation apparatus comprising:

a fixed support suitable for being rigidly constrained to a working base and extending along a vertical axis (Z-Z), perpendicular to the working base;

a rotating support, connected in a rotatable manner to the fixed support, and actuatable in rotation about a first direction (Z'-Z') either parallel or coincident to the vertical axis (Z-Z);

a die suitable for being connected to an output flange of an extruder;

a cutting assembly, extending along a horizontal axis (X-X), substantially orthogonal to the vertical axis (Z-Z), between a blade end suitable for facing the die and a motor end opposite to the blade end along the horizontal axis (X-X), the cutting assembly comprising a motor and a blade assembly comprising cutting blades suitable for being actuated in rotation by the motor for cutting molten plastic material exiting from the die; and connecting means that constrain the cutting assembly to the rotating support;

wherein the connecting means constrain the cutting assembly to the rotating support so that by rotation of the rotating support, the cutting assembly rotates about the first direction (Z'-Z') between a working configuration, in which the cutting assembly is suitable for performing granulation operations on a stream of molten plastic material exiting from the die along an exiting direction (Y-Y) of the stream of plastic material, and a rotated configuration in which the cutting assembly is arranged so that the horizontal axis (X-X) is incident to the exiting direction (Y-Y) of the stream of molten plastic material, and wherein the cutting assembly is supported cantilevered by the rotating support, the maintenance method comprising:

f) interrupting processing and separating the cutting assembly from the output flange of the extruder;

g) rotating the rotating support and bringing the cutting assembly into the rotated configuration; and h) performing cleaning and/or maintenance operations on the cutting assembly and/or the die.

20. The maintenance method of claim 19, wherein the sliding means are suitable for allowing relative translation between the cutting assembly and the rotating support between an advanced position and a retracted position, and wherein, between step f) and step g), the maintenance method comprises:

f1) on the sliding means, actuating sliding of the cutting assembly and taking the cutting assembly to the retracted position.

21. A granulation method for a molten plastic material, the granulation method comprising:

a) providing a granulation apparatus for granulating a plastic material, the granulation apparatus comprising:

a fixed support suitable for being rigidly constrained to a working base and extending along a vertical axis (Z-Z), perpendicular to the working base;

a rotating support, connected in a rotatable manner to the fixed support, and actuatable in rotation about a first direction (Z'-Z') either parallel or coincident to the vertical axis (Z-Z);

a die suitable for being connected to an output flange of an extruder;

a cutting assembly, extending along a horizontal axis (X-X), substantially orthogonal to the vertical axis (Z-Z), between a blade end suitable for facing the die and a motor end opposite to the blade end along the horizontal axis (X-X), the cutting assembly comprising a motor and a blade assembly comprising cutting blades suitable for being put into rotation by the motor for cutting molten plastic material exiting from the die; and connecting means that constrain the cutting assembly to the rotating support;

wherein the connecting means comprise sliding means suitable for allowing relative translation between the cutting assembly and the rotating support, and wherein the connecting means constrain the cutting assembly to the rotating support so that by rotation of the rotating support, the cutting assembly rotates about the first direction (Z'-Z') between a working configuration, in which the cutting assembly is suitable for performing granulation operations on a stream of molten plastic material exiting from the die along an exiting direction (Y-Y) of the stream of plastic material, and a rotated configuration in which the cutting assembly is arranged so that the horizontal axis (X-X) is incident to the exiting direction (Y-Y) of the stream of molten plastic material;

b) operatively connecting the die to the output flange of the extruder;

c) setting the cutting assembly to the working configuration;

d) bringing the blade end of the cutting assembly into contact with the die;

e) granulating the molten plastic material exiting from the die; and f) maintaining the granulation apparatus by the maintenance method of claim 17.

22. A granulation method for a molten plastic material, the granulation method comprising:
  a) providing a granulation apparatus for granulating a plastic material, the granulation apparatus comprising:
    a fixed support suitable for being rigidly constrained to a working base and extending along a vertical axis (Z-Z), perpendicular to the working base;
    a rotating support, connected in a rotatable manner to the fixed support, and actuatable in rotation about a first direction (Z'-Z') either parallel or coincident to the vertical axis (Z-Z);
    a die suitable for being connected to an output flange of an extruder;
    a cutting assembly, extending along a horizontal axis (X-X), substantially orthogonal to the vertical axis (Z-Z), between a blade end suitable for facing the die and a motor end opposite to the blade end along the horizontal axis (X-X),
    the cutting assembly comprising a motor and a blade assembly comprising cutting blades suitable for being actuated in rotation by the motor for cutting molten plastic material exiting from the die; and
    connecting means that constrain the cutting assembly to the rotating support;
    wherein the connecting means constrain the cutting assembly to the rotating support so that by rotation of the rotating support, the cutting assembly rotates about the first direction (Z'-Z') between a working configuration, in which the cutting assembly is suitable for performing granulation operations on a stream of molten plastic material exiting from the die along an exiting direction (Y-Y) of the stream of plastic material, and a rotated configuration in which the cutting assembly is arranged so that the horizontal axis (X-X) is incident to the exiting direction (Y-Y) of the stream of molten plastic material, and
    wherein the cutting assembly is supported cantilevered by the rotating support;
  b) operatively connecting the die to the output flange of the extruder;
  c) setting the cutting assembly to the working configuration;
  d) bringing the blade end of the cutting assembly into contact with the die;
  e) granulating the molten plastic material exiting from the die; and
  f) maintaining the granulation apparatus by the maintenance method of claim 19.

* * * * *